United States Patent [19]
Nagai et al.

[11] Patent Number: 5,472,062
[45] Date of Patent: Dec. 5, 1995

[54] HYDRAULIC DRIVE SYSTEM FOR STEERABLE WHEEL OF DUMP TRUCK

[75] Inventors: Takao Nagai; Yukio Sugano; Nobuki Hasegawa; Masaki Mori; Yoichi Kinosita, all of Kanagawa, Japan

[73] Assignee: Kabushiki Kaisha Komatsu Seisakusho, Tokyo, Japan

[21] Appl. No.: 75,587

[22] PCT Filed: Oct. 15, 1992

[86] PCT No.: PCT/JP92/01345

§ 371 Date: Jun. 15, 1993

§ 102(e) Date: Jun. 15, 1993

[87] PCT Pub. No.: WO93/08039

PCT Pub. Date: Apr. 29, 1993

[30] Foreign Application Priority Data

Oct. 17, 1991 [JP] Japan ................. 3-296602
Aug. 31, 1992 [JP] Japan ................. 4-231904

[51] Int. Cl.$^6$ ........................... B60K 17/30
[52] U.S. Cl. ................. 180/252; 180/255; 180/264; 180/308
[58] Field of Search ................. 180/252, 255, 180/264, 140, 308

[56] References Cited

U.S. PATENT DOCUMENTS 3,780,820  12/1973  Schwab et al. .
4,069,886   1/1978  Campbell et al. ........... 180/252
4,081,049   3/1978  Youmans .................. 180/255
4,282,949   8/1981  Kopich et al. ............. 180/252
4,546,844  10/1985  Stauffer ................... 180/243
5,150,763   9/1992  Yameshita et al. .......... 180/252

FOREIGN PATENT DOCUMENTS 0456175  11/1991  European Pat. Off. .
3045250   9/1981  Germany .
48-42136 12/1973  Japan .
49-20824  2/1974  Japan .
50-28508  8/1975  Japan .
56-53924  5/1981  Japan .
60-18981  6/1985  Japan .

*Primary Examiner*—Margaret A. Focarino
*Assistant Examiner*—Carla Mattix
*Attorney, Agent, or Firm*—Wenderoth, Lind & Ponack

[57] ABSTRACT

A hydraulic drive system of a steerable wheel of a dump truck facilitates the attaching and detaching of a hydraulic motor and allows for a large hydraulic motor to be used. In the drive system, a wheel axle is rotatably supported within a receptacle seat supported on a yoke. The steerable wheel is rotatably mounted on the outer periphery of the receptacle seat. The steerable wheel and one end of the wheel axle are connected via a speed reducer. A motor casing 33 of a hydraulic motor is connected by bolts to the receptacle seat at an end of the seat remote from the steerable wheel so that the hydraulic motor can be attached to and detached from the receptacle seat by tightening and loosening the bolts.

21 Claims, 11 Drawing Sheets

HYDRAULIC DRIVE SYSTEM FOR STEERABLE WHEEL OF DUMP TRUCK

BACKGROUND OF THE INVENTION

1. Field of the Invention

The present invention relates to a system employing a hydraulic motor for driving a steerable wheel of a dump truck.

2. Description of the Related Art

A system for driving a steerable wheel of a traveling vehicle is disclosed in Japanese Examined Patent Publication (Kokoku) No. 48-42136.

In this system, a hollow drum-shaped housing is pivotally supported on a yoke. A vehicular wheel is rotatably supported on the outer periphery of the housing. An output side of a hydraulic motor which is provided within the housing is connected to the vehicular wheel via a reduction mechanism so that the wheel can be rotated by the hydraulic motor, and in conjunction therewith, the wheel can be rocked about the yoke together with the hydraulic motor.

In such a drive system for the steerable wheel, since the hydraulic motor is disposed within the hollow drum-shaped housing supported on the yoke, the yoke may impede the removal and mounting of the hydraulic motor. Once assembled, the hydraulic motor cannot be mounted and removed. Also, the hydraulic motor must be small.

SUMMARY OF THE INVENTION

Accordingly, it is an object of the present invention to provide a hydraulic drive system for a steerable wheel of a dump truck, in which a hydraulic motor can be easily mounted and removed and in which a comparatively larger, i.e. higher capacity, hydraulic motor can be employed.

To achieve this object, a hydraulic drive system of the present invention comprises a yoke supported on a vehicle body so as to be substantially horizontal and so as to be pivotable relative to the vehicle body, a receptacle seat mounted on the yoke so as to be pivotable, a suspension cylinder and a knuckle arm mounted to the receptacle seat, a drive axle rotatably supported within a support shaft portion of the receptacle seat, the steerable wheel rotatably supported on the outer periphery of the support shaft portion, and one end of the drive axle being connected to the steerable wheel through a reduction mechanism, and a hydraulic motor detachably mounted to the receptacle seat at an end thereof remote from the steerable wheel, the hydraulic motor having a rotary shaft that is connected to the other end of the drive axle.

A main hydraulic pump driven by the engine of the vehicle is connected to a steering circuit, whereas an auxiliary hydraulic pump driven by an output of a power transmission of the vehicle is selectively connected by a valve to the steering circuit and a drive circuit. The valve will connect the auxiliary pump to the drive circuit when the discharge of the main hydraulic pump is large and to the steering circuit when the discharge of the main hydraulic pump is small. The drive circuit is connected to the hydraulic motor.

The rotary shaft of the hydraulic motor may be connected to the end of the drive axle via a clutch.

In this case, the drive circuit is concurrently connected to both the hydraulic motor and the clutch or is connected to the hydraulic motor through a second valve. This second valve is adapted to connect the drive circuit to only the hydraulic motor when the flow rate in the drive circuit is large and to connect the drive circuit to both the hydraulic motor and the clutch when such a flow rate is small.

In an alternative form of the invention, the output of the reduction mechanism is connected to the steerable wheel through the clutch.

Because the hydraulic motor is mounted on the receptacle seat at a position remote from the steerable wheel, the hydraulic motor can be easily detached and attached. Also, a larger hydraulic motor can be employed.

Also, since the auxiliary hydraulic pump is driven at a speed synchronous with the drive wheel, the steerable wheel can be driven in synchronism with the drive wheel. Also, since steering can be performed by supplying the discharged pressurized fluid of the auxiliary hydraulic pump to the steering circuit when the discharge of the main hydraulic pump is small, the auxiliary hydraulic pump may function as an emergency steering pump.

When the clutch is used in the present invention, the steerable wheel can be placed in a state of free rotation. When the flow rate in the drive circuit is large, the second valve is switched so as to prevent pressurized fluid from flowing to the clutch, so that the steerable wheel automatically assumes a state of free rotation suitable for high speed traveling.

Because the rotation of the steerable wheel is not transmitted to the reduction mechanism when the clutch is disengaged, the useful life of the reduction mechanism is prolonged.

The above-mentioned and other objects, aspects and advantages of the present invention will become more clear to those skilled in the art upon reviewing the detailed description of the preferred embodiments presented below in connection with the accompanying drawings.

BEST MODE FOR CARRYING OUT THE INVENTION

The present invention will be discussed hereinafter in detail with reference to the drawings.

Figure 1:
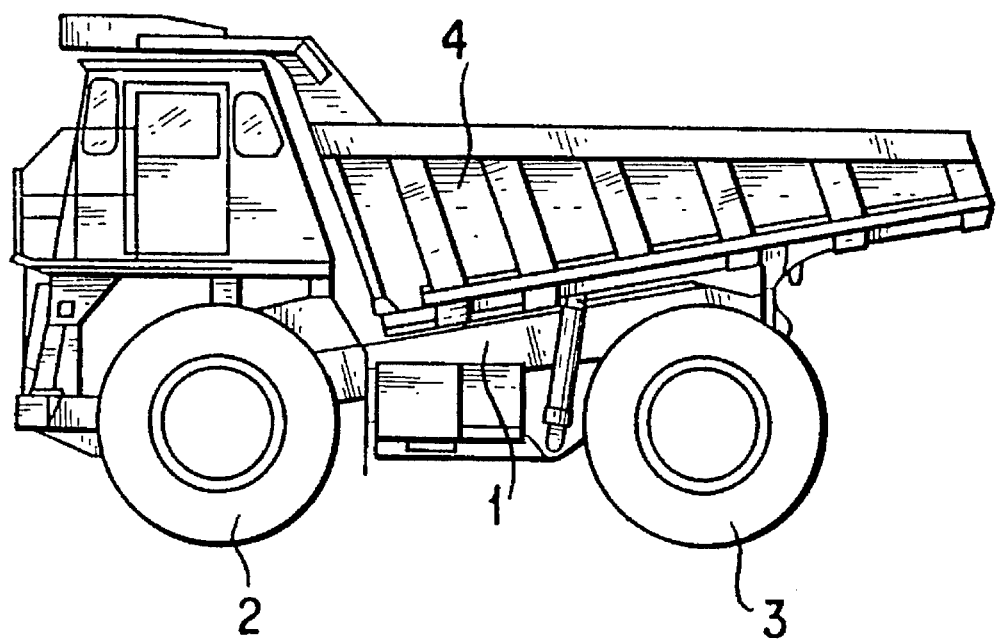
FIG. 1 is a side elevation view of a dump truck to which a hydraulic drive system of a steerable wheel according to the present invention can be applied.
Figure 2:
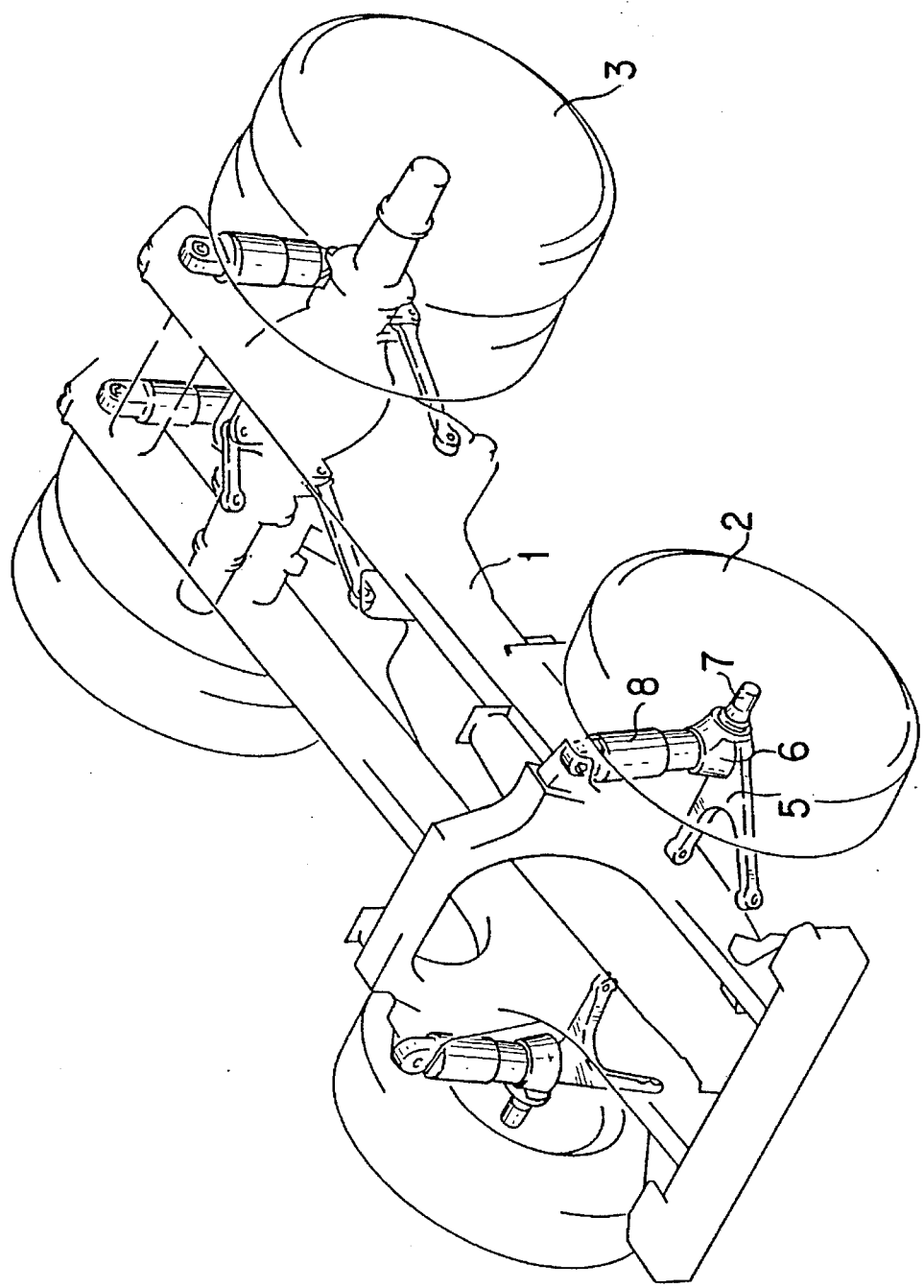
FIG. 2 is a perspective view of a framework of the dump truck.

As shown in FIG. 1, a dump truck includes steerable wheels 2 at the front portion of a vehicle body 1, drive wheels 3 at the rear portion of the vehicle body, and a tiltable vessel 4. As shown in FIG. 2, bifurcated yokes 5 are pivotally supported on front left and right side surfaces of the vehicle body 1. The steerable wheels are rotatably mounted on support shaft portions 7 of receptacle seats 6 pivotally provided on these yokes 5, respectively. Suspension cylinders 8 are connected between the receptacle seats 6 and the vehicle body 1.

Figure 3:
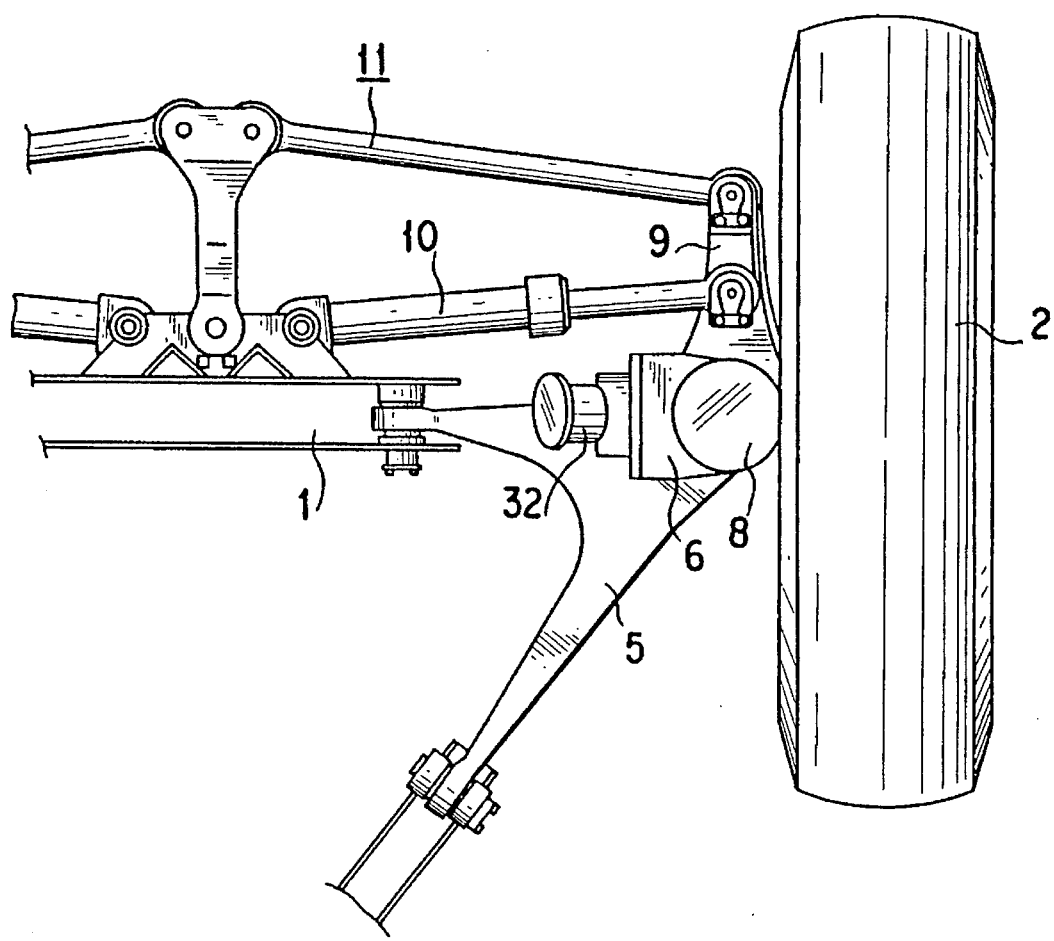
FIG. 3 is a plan view of a steerable wheel mounting portion of a hydraulic drive system according to the present invention.
Figure 4:
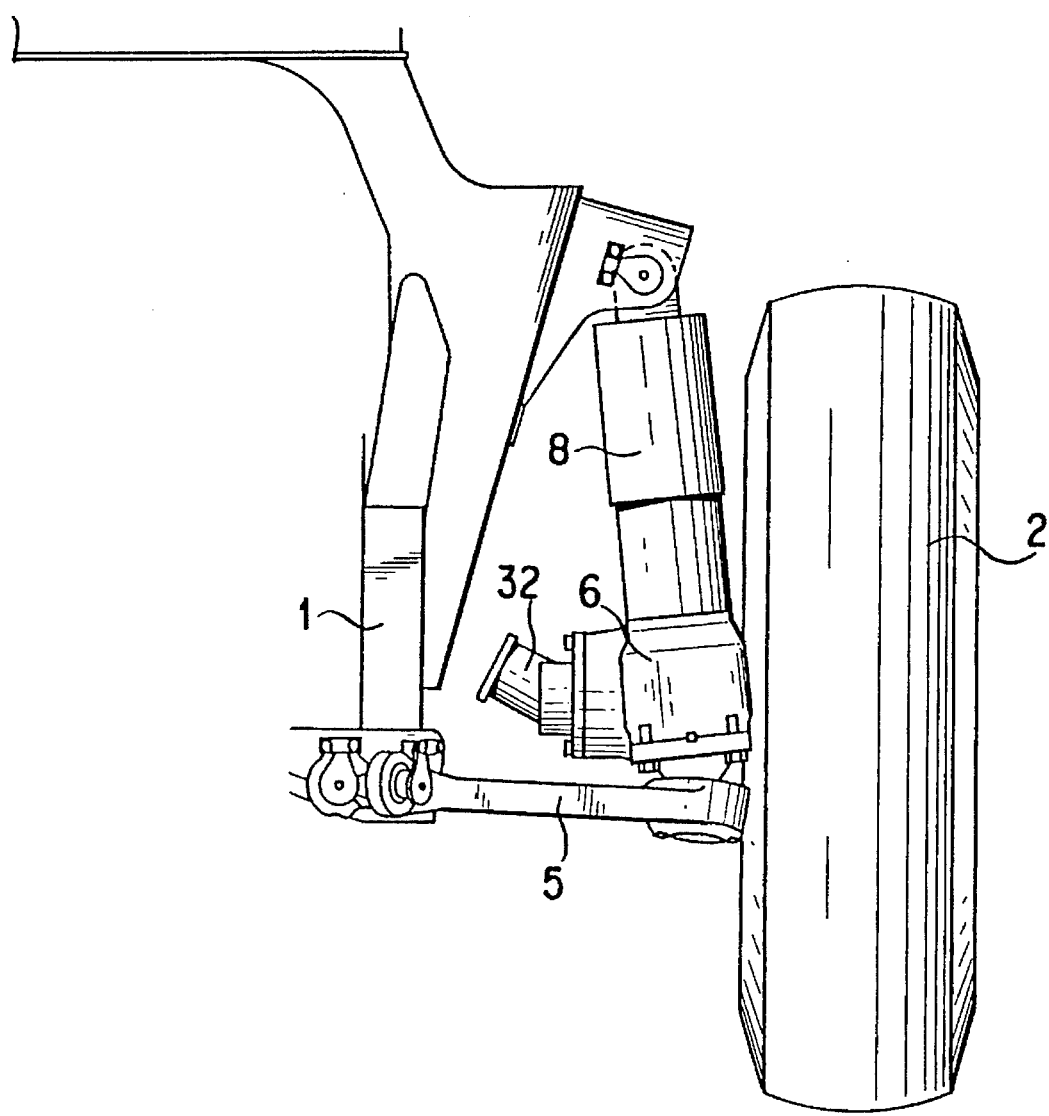
FIG. 4 is a front elevation view of the steerable wheel mounting portion.

As shown in FIGS. 3 and 4, a knuckle arm 9 is provided on each receptacle seat 6. A steering cylinder 10 is connected between the knuckle arm 9 and the vehicle body. The left and right knuckle arms 9,9 are connected by a linkage which pivots the receptacle seat 6 to change the orientation of the steerable wheels 2 when the steering cylinder 10 is extended or retracted.

Figure 5:
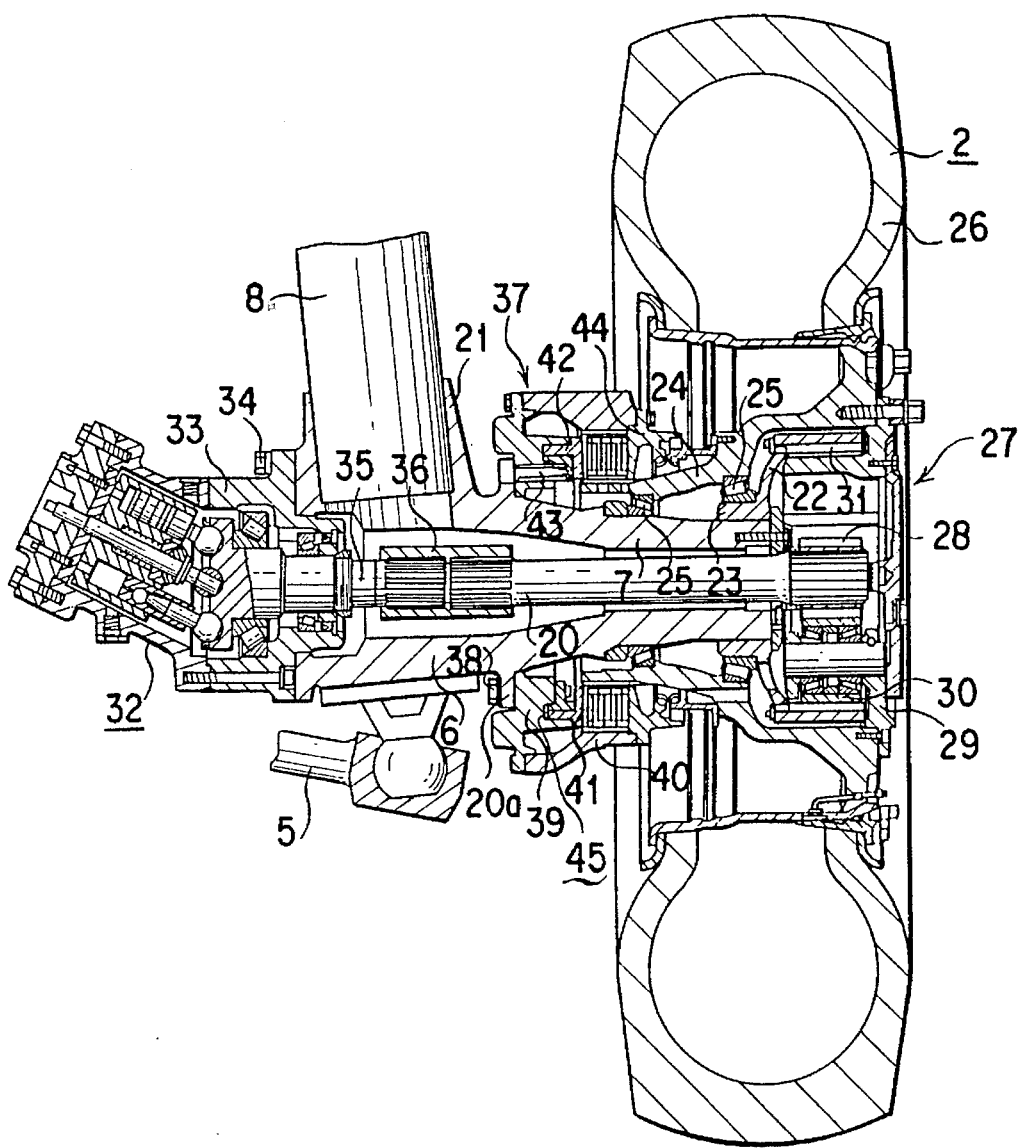
FIG. 5 is a sectional view of a hydraulic motor mounting portion of a first embodiment of a hydraulic drive system according to the present invention.

FIG. 5 shows a hydraulic motor supporting portion of the first embodiment of the drive system.

The receptacle seat 6 comprises a base portion 21 and the laterally extending cylindrical support shaft portion 7. A drive axle 20 is rotatably supported within the support shaft portion 7. A boss portion 23 of a flange 22 is engaged with the outer periphery of the support shaft portion 7 and fixed thereto. A wheel hub 24 is rotatably supported via a bearing 25 between the boss portion 23 and the support shaft portion 7. A tire 26 is mounted on the wheel hub 24 to form the steerable wheel 2. One end of the drive axle 20 and the wheel hub 24 are connected via a planetary gear type of reduction mechanism 27.

The reduction mechanism 27 includes a sun gear 28, a planetary gear 30 provided on a carrier 29 and ring gear 31. The sun gear 28 is mounted on the drive axle 20. The carrier 29 is connected to the wheel hub 24. The ring gear 31 is connected to the flange 22. Therefore, when the drive axle 20 is rotated, the wheel hub 24 rotates at a reduced speed to drive the steerable wheel 2.

A motor casing 33 of a hydraulic motor 32 is connected to the end of the mounting base portion 21 of receptacle seat 6 remote from the steerable wheel 2. A rotary shaft 35 of the hydraulic motor 32 is coupled with the drive axle 20 coupling 36 that couples splines of the shaft 35 and axle 20. A brake mechanism 37 is provided between the support shaft portion 7 and the wheel hub 24.

The brake mechanism 37 includes an end plate 39 connected to an outer flange 20*a* of the support shaft portion 7 by bolts 38. Brake discs 41 are alternately mounted by splined couplings to the cylindrical body 40 fixed to the end plate 39 and the wheel hub 24. A braking force can thus be applied to the wheel hub 24 by supplying fluid to a fluid chamber 45 to shift a piston 42 against a spring 43 thereby in turn forcing the brake discs into engagement. The braking force is relieved by draining the fluid from the fluid chamber 45 which allows the piston 42 to be shifted by the spring 43 to cause the brake discs 41 to move away from each other.

Figure 6:
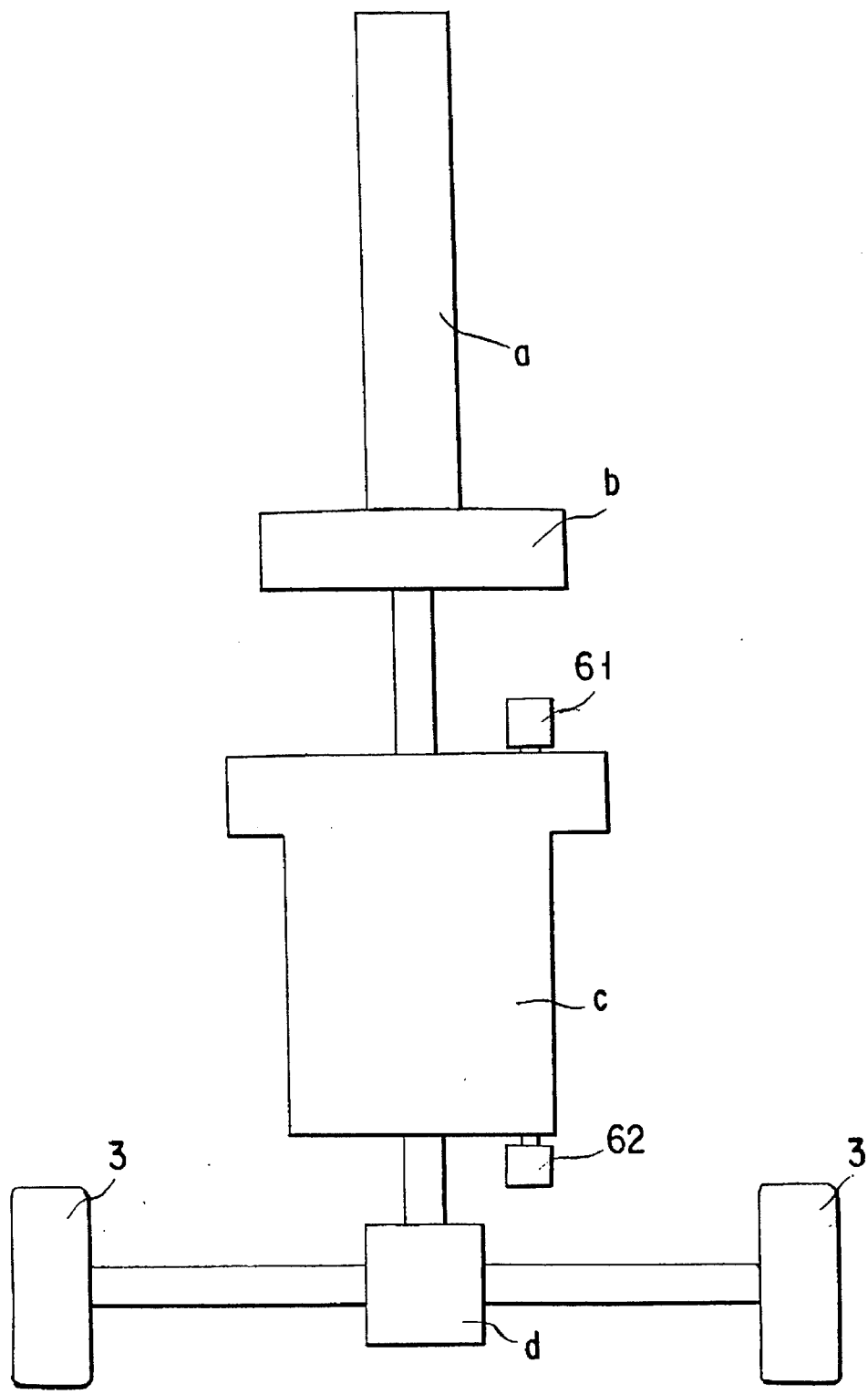
FIG. 6 is a schematic diagram of a drive system of a vehicle.

As shown in FIG. 6, the drive wheel 3 is driven by an engine a via a torque converter b, a power transmission c, a differential mechanism d and so forth. With the engine a, a main hydraulic pump 61 is driven. An auxiliary hydraulic pump 62 is driven at the output side of the power transmission c.

Figure 7:
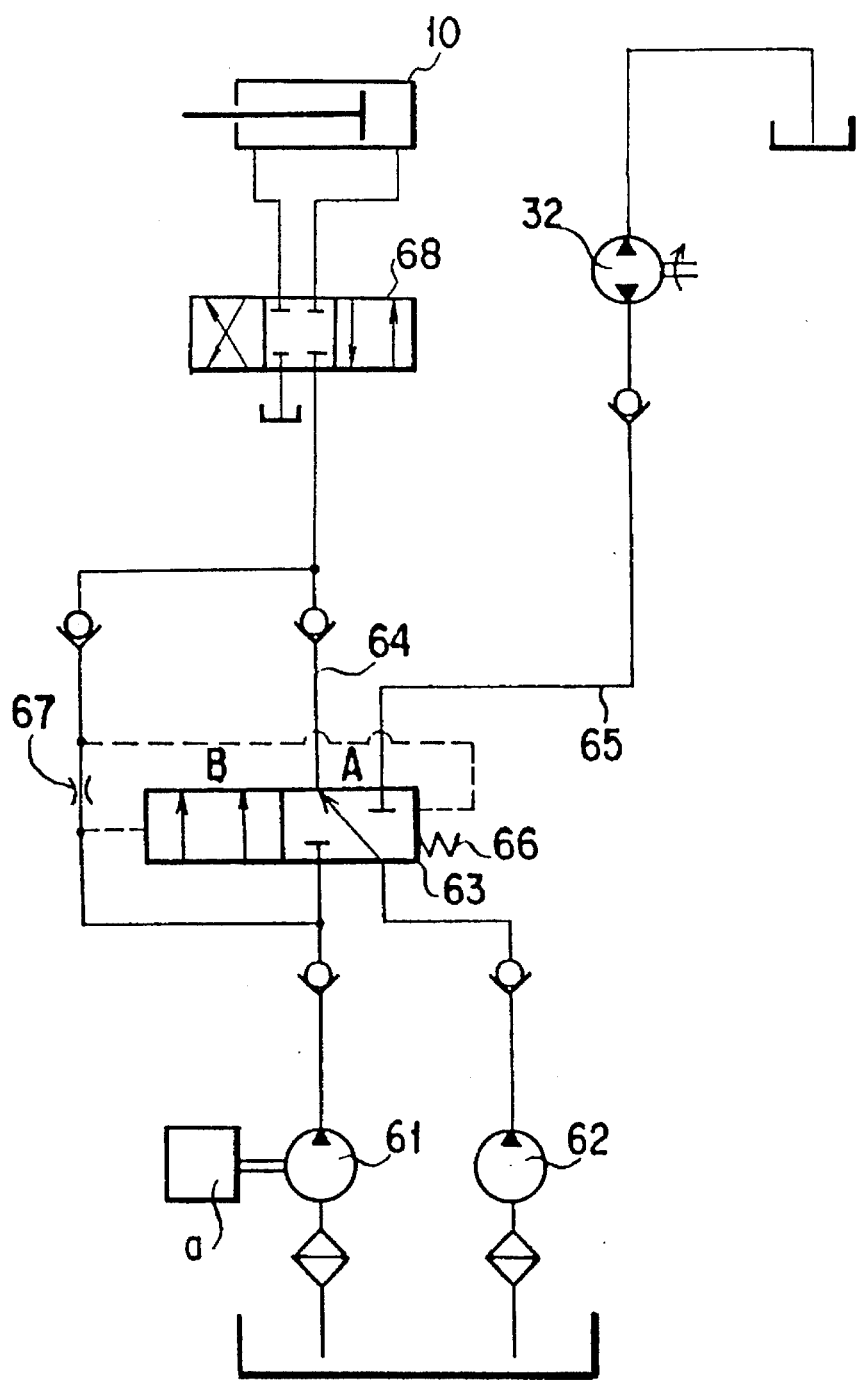
FIG. 7 is a schematic diagram of a hydraulic system of the first embodiment.

As shown in FIG. 7, the pressurized fluid discharged from the main hydraulic pump 61 and the pressurized fluid discharged from the auxiliary hydraulic pump 62 are supplied to a steering circuit 64 and a drive circuit 65 under the control of a valve 63. The valve 63 is held at the first position A by a spring 66, and is switched to the second position B when a pressure difference occurs across an orifice 67.

The steering circuit 64 is connected to the inlet side of a steering valve 68. The drive circuit 65 is connected to the hydraulic motor 32.

Next, the operation of the drive system will be described.

While the engine a and the main hydraulic pump 61 operate in a normal state, the valve 63 assumes the second position B so that the pressurized fluid discharged form the auxiliary hydraulic plump 62 is fed to the hydraulic motor 32 to drive the output shaft 35 which in turn rotates the drive axle 7 through the coupling 36 and thus drives the steerable wheel via the wheel hub 24 and the reduction mechanism 27. In addition, since the auxiliary hydraulic pump 62 is driven by the power transmission c, the discharge of the pump 62 is proportional to the speed of the drive wheel 3, and the steerable wheel 2 can be driven in synchronism with the drive wheel 3 by the hydraulic motor 32. In this condition, the steerable wheel 2 can be braked by applying a braking force to the wheel hub 24 with the brake mechanism 37. Also, by extending and retracting the steering cylinder 10, the receptacle seat 6 can be pivoted via the knuckle arm 9 to pivot the steerable wheel 2 together with the hydraulic motor 32.

When the fluid discharged to cylinder 10 becomes insufficient due to a failure of the engine a or failure of the main hydraulic pump 61, the valve 63 is switched to the first position A.

Accordingly, the pressurized fluid discharged from the auxiliary hydraulic pump 62 is supplied to the first circuit 64 to make steering possible. Therefore, the auxiliary hydraulic pump 62 functions as an emergency pump.

Next, the second embodiment of the hydraulic driving system will be described.

Figure 8:
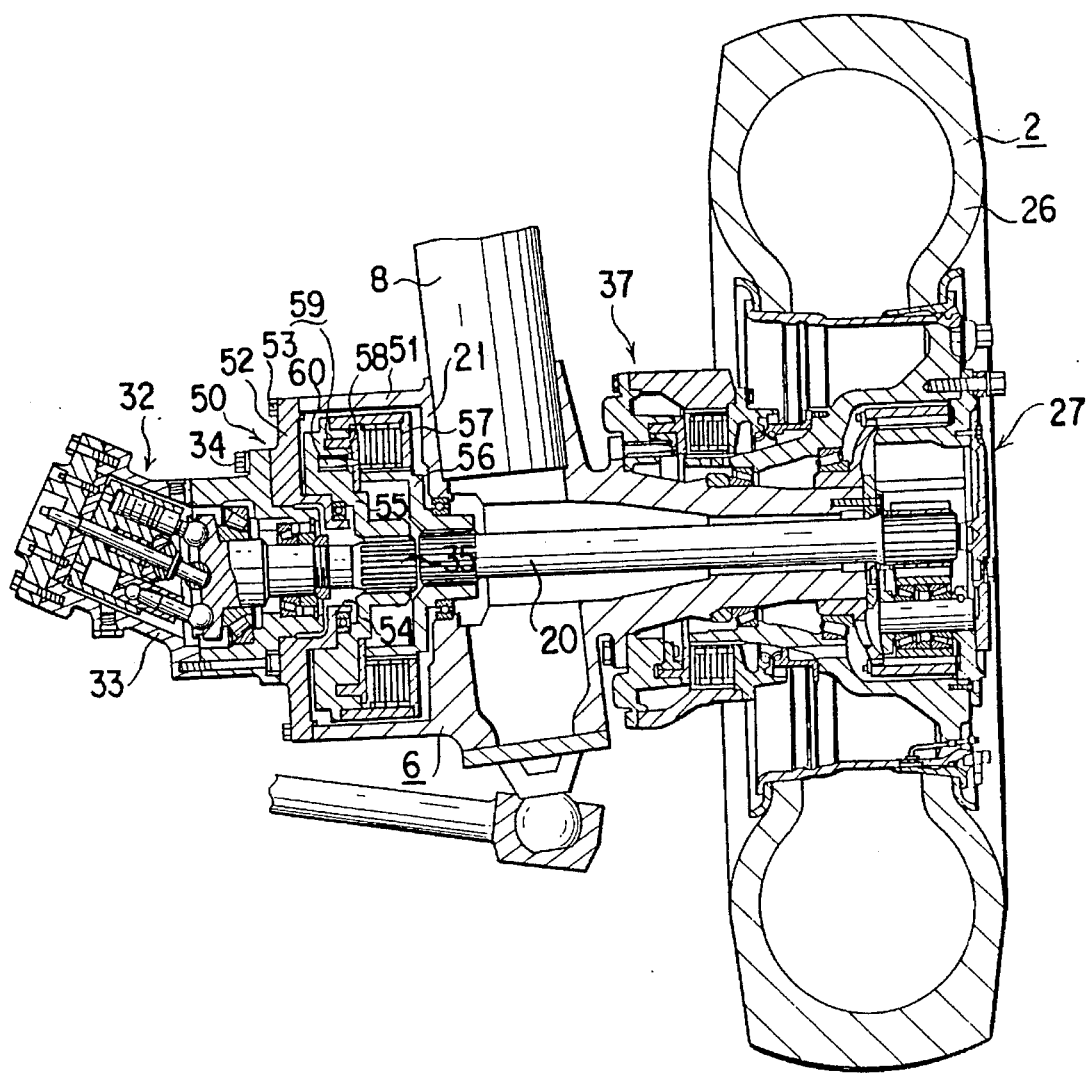
FIG. 8 is a sectional view of the hydraulic motor mounting portion of a second embodiment of the present invention.

As shown in FIG. 8, in the shown embodiment, the drive axle 20 and the rotary shaft 35 of the hydraulic motor 32 are connected via a clutch mechanism 50.

Specifically, a large diameter cylindrical body 51 is formed integrally with the mounting base portion 21 of the receptacle seat 6 at an end of the base portion 21 remote from the steerable wheel 2. An end plate 52 is connected by bolts 53 to the open end of the cylindrical body 51. The motor body 33 of the hydraulic motor 32 is mounted on the end plate 52 by bolts 34 such that the rotary shaft 35 extends through a central hole 54 of the end plate 52. The rotary shaft 35 is coupled with a drive body 55, which is rotatably supported on the end plate 52, by a spline coupling, and the drive axle 20 is coupled with a driven body 56 which is rotatably supported within the cylindrical body 51. Clutch discs 57 are mounted by spline couplings to the driven body 46 and the drive body 55. A piston 58 pressed by fluid pressure in a fluid chamber 59 causes the clutch discs to engage. The piston 58 is returned by a spring 60 to release the clutch discs 57 and thereby disengage the clutch.

In the drive system described above, when the clutch mechanism 50 is disengaged while the steerable wheels 2 are not driven, the rotation of the wheel axle 7 will not be transmitted to the drive shaft 35 of the hydraulic motor 32 so as to prevent the hydraulic motor 32 from revolving. When the steerable wheels 2 are driven, the clutch mechanism 50 is placed at an intermediate position (between positions at which the clutch is engaged and disengaged), by controlling the fluid pressure to the fluid chamber 59 so that a difference between the left and right steerable wheels 2,2 can be accommodated.

Figure 9:
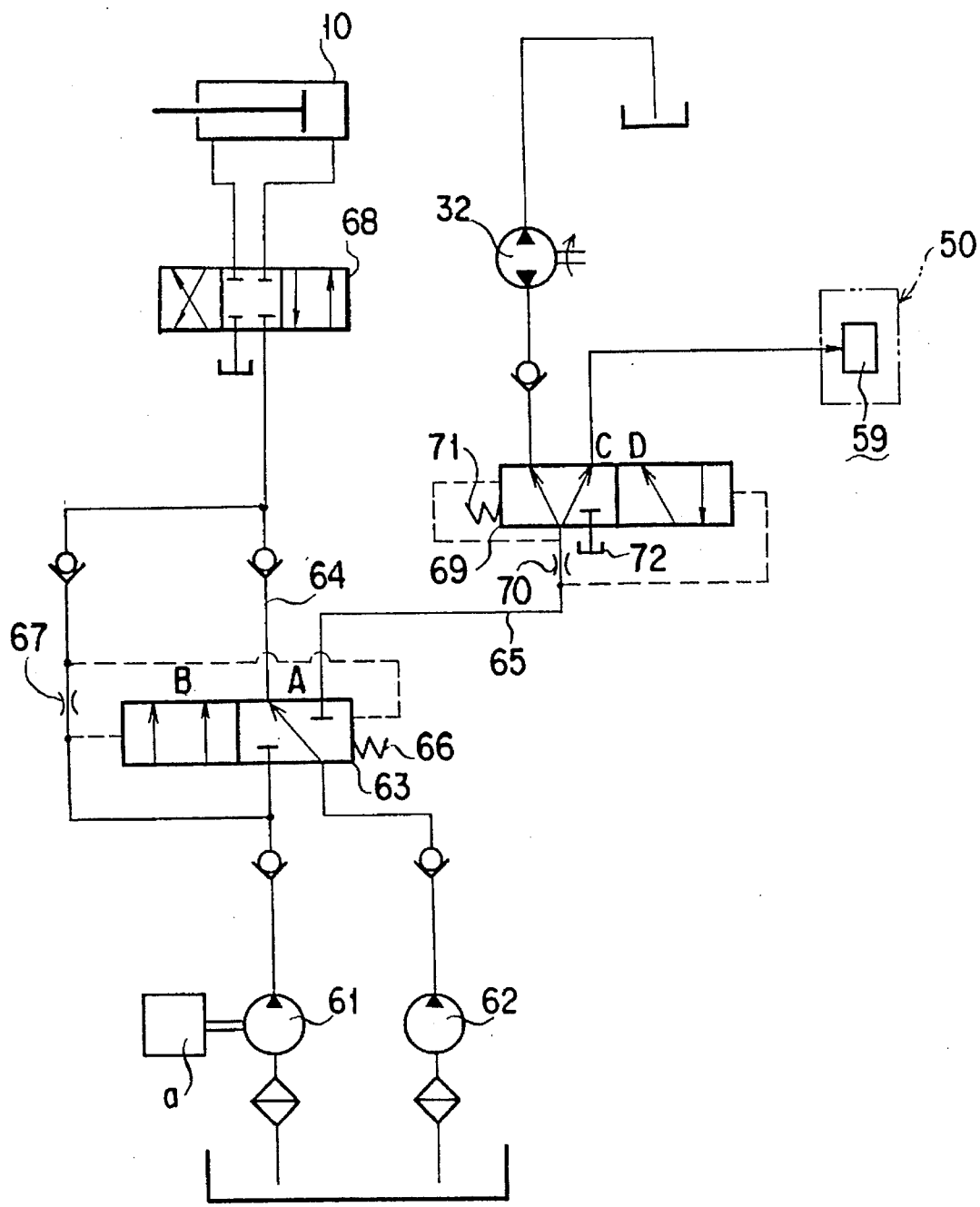
FIG. 9 is a schematic diagram of a hydraulic system of the second embodiment.

FIG. 9 is a hydraulic circuit diagram. The pressurized fluid discharged from the main hydraulic pump 61 driven by the engine a and the auxiliary hydraulic pump 62 provided at the output side of the axle or the power transmission c for emergency steering is supplied to the steering circuit 64 and the drive circuit 65 by the valve 63. The drive circuit 65 is selectively connected to the hydraulic motor 32 and the clutch mechanism 50.

The valve 69 is positioned at the first position C when a pressure difference occurring across an orifice 70 provided in the drive circuit 65 is small, whereupon the pressurized fluid of the drive circuit 65 is supplied to the hydraulic motor 32 and the hydraulic chamber 59 of the clutch mechanism 50. The valve 69 is positioned at the second position D when the pressure difference across the orifice 70 is larger, whereupon the pressurized fluid of the drive circuit 65 is only supplied to the hydraulic motor 32 and the pressurized fluid in the fluid chamber 59 of the clutch mechanism 50 is drained to a tank 72.

In the embodiment described above, the auxiliary hydraulic pump 62 functions as an emergency pump and, since it discharges fluid in an amount proportional to the rotational speed of the drive wheel 3, a complicated speed control for the hydraulic motor 32 is unnecessary and the vehicle speed is accurately controlled while the steerable wheels 2 are driven. Furthermore, when the vehicle speed becomes higher than or equal to a set vehicle speed which increases the amount of fluid discharged by the main and auxiliary hydraulic pumps 61,62, the valve 69 is switched to the second position D to disengage the clutch mechanism 50 and thus automatically terminate the driving of the steerable wheels 2 resulting in free rotation of the steerable wheels 2.

Next, the third embodiment will be described.

Figure 10:
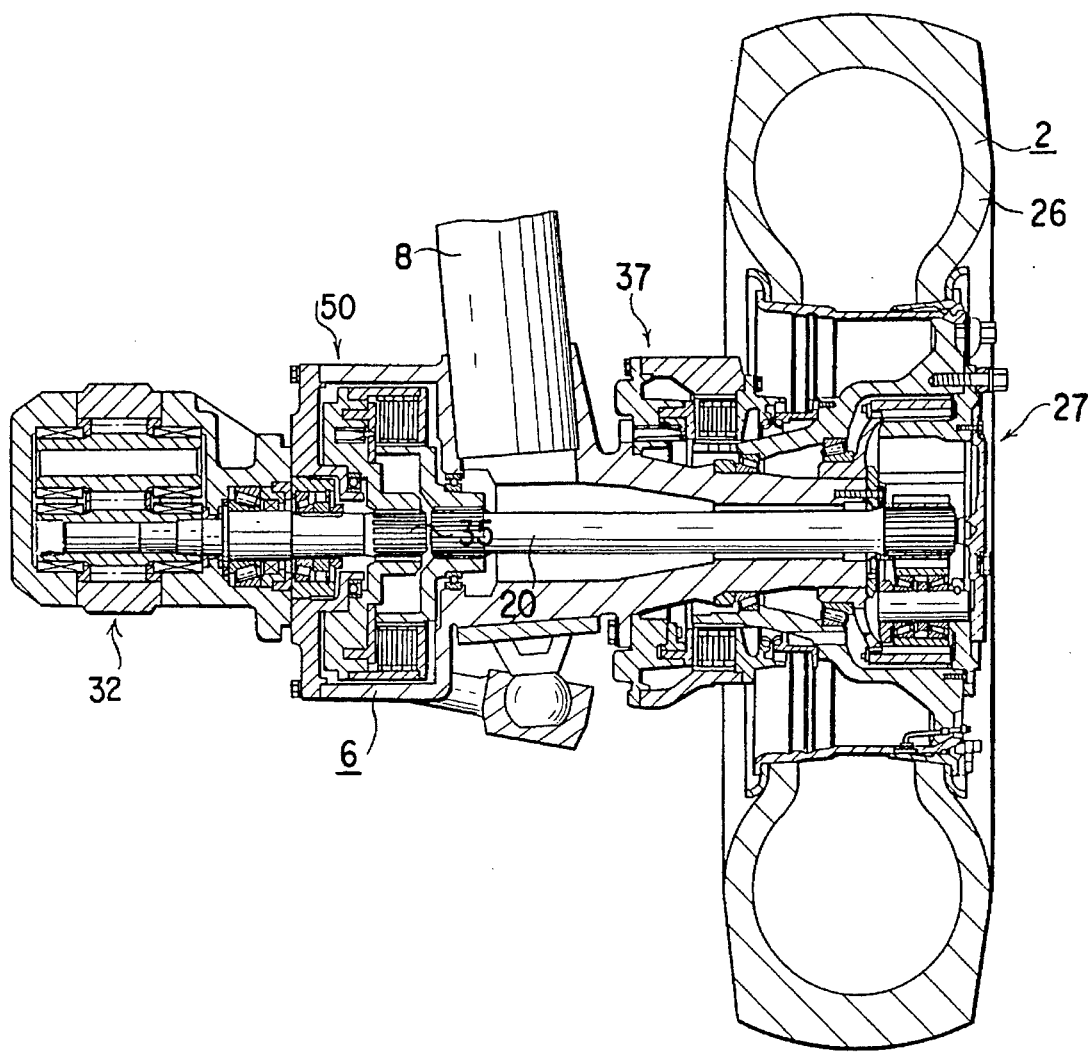
FIG. 10 is a sectional view of the hydraulic motor mounting portion of a third embodiment of the present invention.

As shown in FIG. 10, a gear type of hydraulic motor is employed as the hydraulic motor 32. The rotary shaft 35 of the hydraulic motor is connected to the drive axle 20 via the clutch mechanism 50.

Next, the fourth embodiment will be described.

Figure 11:
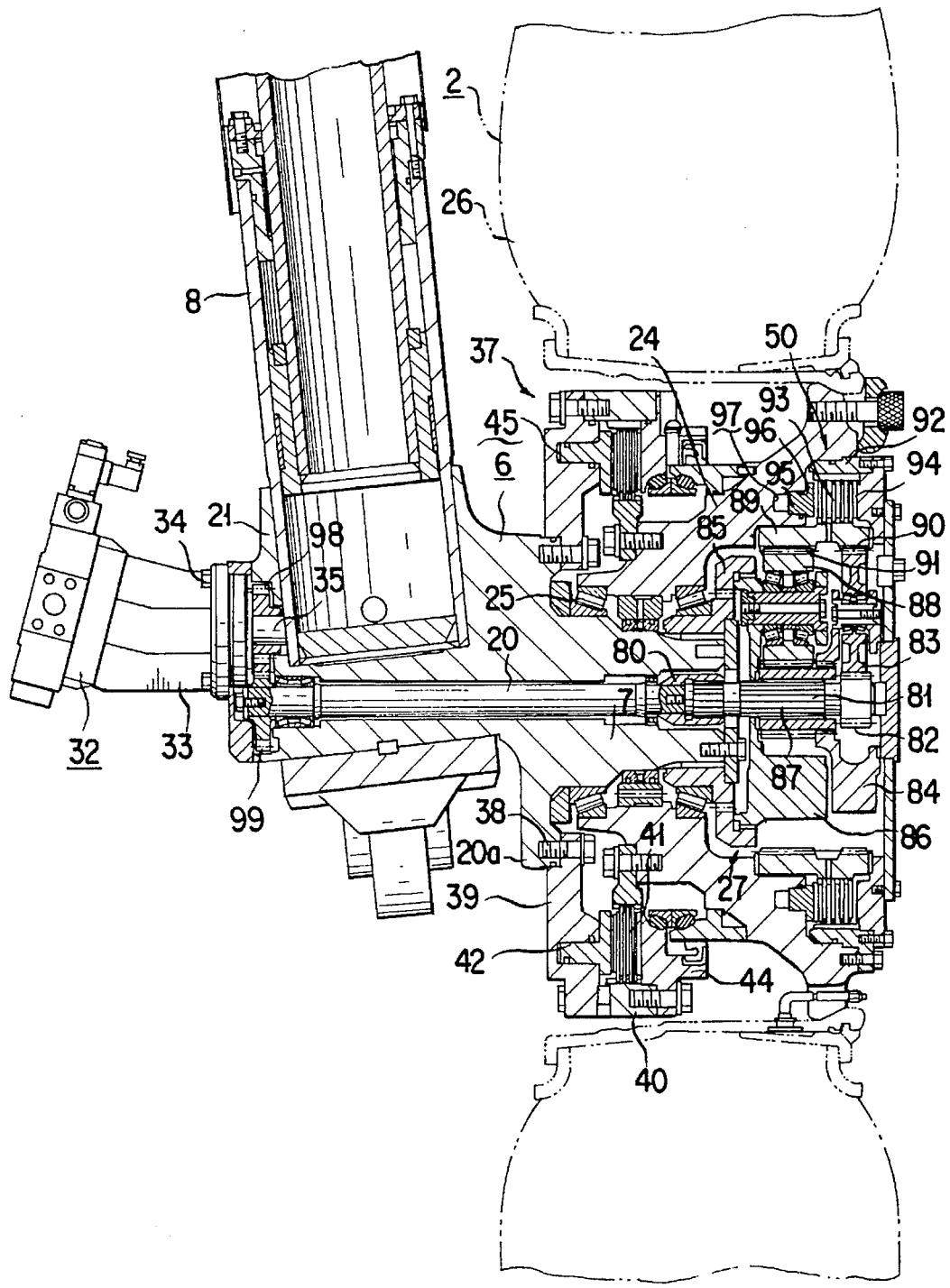
FIG. 11 is a sectional view of the hydraulic motor mounting portion of a fourth embodiment of the present

As shown in FIG. 11, the receptacle seat 6 comprises the mounting base portion 2 and the laterally oriented cylindrical support shaft portion 7. The drive axle 20 is rotatably supported within the support shaft portion 7. The wheel hub 24 is rotatably supported on the outer periphery of the support shaft portion 7 via the bearing 25. The tire 26 is mounted in the wheel hub 24. Thus, the steerable wheel 2 is formed. One end of the drive axle 20 and the wheel hub 24 are connected to the planetary gear type of reduction mechanism 27 via the clutch mechanism 50.

The reduction mechanism 27 includes a first sun gear 82 integrally provided with an input shaft 81 connected to the drive axle 20 via a coupling 80, a first planetary gear 83 meshing with the first sun gear 82, a first carrier 84 supporting the first planetary gear 83, a stationary ring gear 85 coupled with the end of the support shaft portion 7 of the receptacle seat 6 by splines, a second sun gear 87 supported on the support shaft portion 7, a second planetary gear 88 provided on a second carrier 86 which is splined with the stationary ring gear 85 and meshes with the second sun gear 87, and a driving cylindrical body 89 rotatably supported on the wheel hub 24. First and second internal gears 90,91 formed on the driving cylindrical body 89 are meshed with the first and second planetary gears 83, 88, respectively. The first carrier 84 is meshed with the second sun gear 87. Thus, a two-stage reduction mechanism is formed.

The clutch mechanism 50 includes drive clutch plates 93 and driven clutch plates 94 alternately splined to the driven cylindrical body 92, which is fixed to the wheel hub 24 by bolts, and the driving cylindrical body 89. The driving clutch plates 93 are movable into engagement with the driven clutch plates 94 by a piston 96. The piston 95 is ring-shaped and cooperates with an annular cavity 96 of the wheel hub 24 to define a pressure receiving chamber 94. When pressurized fluid is supplied to the pressure receiving chamber 97, the piston 95 is extended to force the driving clutch plates 93 into engagement with the driven clutch plates 94 whereby rotation of the drive axle 20 is transmitted to the wheel hub 24. On the other hand, when the pressurized fluid is drained from the pressure receiving chamber 97, the driving clutch plates 93 and the driven clutch plate 94 are released form each other to disconnect the reduction mechanism 27 provided on the drive axle 20 and the wheel hub 24. As a result, during high speed travel, the reduction mechanism 27 is never rotated by the rotation of the steerable wheel, so that an abnormal wearing of respective components of the reduction mechanism can be successfully prevented.

The motor body 33 of the hydraulic motor 32 is connected by bolts 34 to an end of the mounting base portion 21 remote from the steerable wheel 2. The rotary shaft 35 of the hydraulic motor 32 is connected to the drive axle 20 via a first gear 98 and a second gear 99. A brake mechanism 37 is disposed between the support shaft portion 7 and the wheel hub 24.

The brake mechanism 37 includes an end plate 39 connected to an outer flange 20a by bolts 38. Brake discs 41 are alternately mounted by splined couplings to the cylindrical body 40 fixed to the end plate 39 and the wheel hub 24. A braking force can thus be applied to the wheel hub 24 by supplying fluid to a fluid chamber 45 to shift a piston 42 against a spring 43, thereby in turn forcing the brake discs 41 into engagement.

As explained above, the hydraulic drive system for the steerable wheel of the dump truck according to the present invention facilitates the attaching and detaching of the hydraulic motor. Also, since the present invention can employ a hydraulic motor of a relatively large capacity, it is effective for the steerable wheel of a large dump truck.

We claim:

1. A hydraulic drive system of a steerable wheel of a vehicle, said drive system comprising:

a yoke pivotally supported by a body of the vehicle and oriented substantially horizontally between the body of the vehicle and the steerable wheel of the vehicle, a receptacle seat mounted on said yoke so as to be pivotable relative to said yoke, said receptacle seat having a support shaft portion on which the steerable wheel is rotatably supported, a suspension cylinder and a knuckle arm connected to said receptacle seat, a drive axle rotatably supported within said support shaft portion of said receptacle seat, a speed-reducer connecting one end of said drive axle to the steerable wheel, a hydraulic motor having an outer casing detachably mounted to said receptacle seat at an end of said seat remote from the steerable wheel such that said motor can be detached from and attached to said seat, said hydraulic motor also having a rotary shaft that extends into said receptacle seat and is connected to the other end of said drive axle.

2. A hydraulic drive system of a steerable wheel of a vehicle, said drive system comprising:

a yoke pivotally supported by a body of the vehicle and oriented substantially horizontally between the body of the vehicle and the steerable wheel of the vehicle, a receptacle seat mounted on said yoke so as to be pivotable relative to said yoke, said receptacle seat having a support shaft portion on which the steerable wheel is rotatably supported, a suspension cylinder and a knuckle arm connected to said receptacle seat, a drive axle rotatably supported within said support shaft portion of said receptacle seat, a speed-reducer connecting one end of said drive axle to the steerable wheel, and a hydraulic motor having an outer casing detachably mounted to said receptacle seat at side thereof remote from the steerable wheel such that said motor can be detached from and attached to said seat, said hydraulic motor also having a rotary shaft that extends into said receptacle seat and is connected to the other end of said drive axle, a hydraulic actuator connected to said knuckle arm, a main hydraulic pump driven by an engine of the vehicle, a steering circuit connecting said main hydraulic pump to said hydraulic actuator, an auxiliary hydraulic pump provided downstream of an output end of a power transmission of the vehicle with respect to the direction in which power is transmitted from the engine through the transmission, a drive circuit connected to said hydraulic motor, and a valve positionable to selectively connect said auxiliary hydraulic pump to said drive circuit and to said steering circuit.

3. A hydraulic drive system of a steerable wheel of a vehicle, said drive system comprising:

a yoke pivotally supported by a body of the vehicle and oriented substantially horizontally between the body of the vehicle and the steerable wheel of the vehicle, a receptacle seat mounted on said yoke so as to be pivotable relative to said yoke, said receptacle seat having a support shaft portion on which the steerable wheel is rotatably supported, a suspension cylinder and a knuckle arm connected to said receptacle seat, a drive axle rotatably supported within said support shaft portion of said receptacle seat, a speed-reducer connecting one end of said drive axle to the steerable wheel, a hydraulic motor having an outer casing detachably mounted to said receptacle seat at a side thereof remote from the steerable wheel such that said motor can be detached from and attached to said seat, said hydraulic motor also having a rotary shaft that extends into said receptacle seat, and a clutch connecting said rotary shaft to the other end of said drive axle.

4. A hydraulic drive system of a steerable wheel of a vehicle, said drive system comprising:

a yoke pivotally supported by a body of the vehicle and oriented substantially horizontally between the body of the vehicle and the steerable wheel of the vehicle, a receptacle seat mounted on said yoke so as to be pivotable relative to said yoke, said receptacle seat having a support shaft portion on which the steerable wheel is rotatably supported, a suspension cylinder and a knuckle arm connected to said receptacle seat, a drive axle rotatably supported within said support shaft portion of said receptacle seat, a speed-reducer connecting one end of said drive axle to the steerable wheel, a hydraulic motor having an outer casing detachably mounted to said receptacle seat at a side thereof remote from the steerable wheel such that said motor can be detached from and attached to said seat, said hydraulic motor also having a rotary shaft that extends into said receptacle seat, and a clutch connecting said rotary shaft to the other end of said drive axle, a hydraulic actuator connected to said knuckle arm, a main hydraulic pump driven by an engine of the vehicle, a steering circuit connecting said main hydraulic pump to said hydraulic actuator, an auxiliary hydraulic pump provided downstream of an output end of a power transmission of the vehicle with respect to the direction in which power is transmitted from the engine through the transmission, a drive circuit, a first valve positionable to selectively connect said auxiliary hydraulic pump to said drive circuit and to said steering circuit, and a second valve positionable to concurrently connect said drive circuit to both said hydraulic motor and said clutch and to connect said drive circuit to said hydraulic motor without said drive circuit being connected to said clutch.

5. A hydraulic drive system of a steerable wheel of a vehicle, said drive system comprising:

a yoke pivotally supported by a body of the vehicle and oriented substantially horizontally between the body of the vehicle and the steerable wheel of the vehicle, a receptacle seat mounted on said yoke so as to be pivotable relative to said yoke, said receptacle seat having a support shaft portion on which the steerable wheel is rotatably supported, a suspension cylinder and a knuckle arm connected to said receptacle seat, a drive axle rotatably supported within said support shaft portion of said receptacle seat, a speed-reducer connecting one end of said drive axle to the steerable wheel, a clutch connecting an output end of said speed-reducer to the steerable wheel, and a hydraulic motor having an outer casing detachably mounted to said receptacle seat at a side thereof remote from the steerable wheel such that said motor can be detached from and attached to said seat, said hydraulic motor also having a rotary shaft that extends into said receptacle seat and is connected to the other end of said drive axle.

6. A hydraulic drive system of a steerable wheel of a vehicle, said system comprising:

a steering assembly interposed between the wheel and a body of the vehicle, the steering assembly mounting the wheel on the body of the vehicle so as to be steerable, said steering assembly including a pivotal member pivotable about a substantially vertical axis, said pivotal member having an external end on which the steerable wheel is mounted and an internal end remote from the steerable wheel;

a drive axle drivingly connected to the steerable wheel;

a hydraulic motor having an outer casing detachably mounted to the internal end of said pivotal member such that said hydraulic motor is externally accessible at the side of the body of the vehicle and the hydraulic motor can be detached from and attached to the pivotal member, said hydraulic motor being drivingly coupled with said drive axle so as to output a drive torque transmitted to the steerable wheel by said drive axle; and a hydraulic fluid supply system including a hydraulic line connected to said hydraulic motor.

7. A hydraulic drive system as set forth in claim 6, wherein said hydraulic fluid supply system also includes a hydraulic steering line connected to said pivotal member.

8. A hydraulic drive system as set forth in claim 7, wherein said hydraulic fluid supply system comprises a first pump driven by an engine of the vehicle at a speed corresponding to the speed at which a drive wheel driven by the engine of the vehicle is rotated, said first pump being connected to said hydraulic steering line, and said second pump being connected to said hydraulic motor through said hydraulic drive line so as to drive said hydraulic motor at a speed proportional to the speed at which the drive wheel is rotated.

9. A hydraulic drive system as set forth in claim 8, wherein said hydraulic fluid supply system further comprises a valve which is positionable to establish fluid communication between said second pump and said hydraulic drive line and between said second pump and said hydraulic steering line such that said valve selectively hydraulically connects said second pump to said hydraulic motor and to said steering assembly.

10. A hydraulic drive system as set forth in claim 9, wherein said valve normally connects said second pump to said hydraulic drive line and is responsive to a given pressure difference between the discharge pressure of said first pump and pressure in said hydraulic steering line, indicative of a shortage of discharge pressure produced by said first pump, by establishing fluid communication between said second pump and said hydraulic steering line.

11. A hydraulic drive system as set forth in claim 8, and which further comprises a clutch disposed between said hydraulic motor and said drive axle, said clutch being engageable and disengageable to allow and prevent transmission of driving torque, produced by said hydraulic motor, to said drive axle.

12. A hydraulic drive system as set forth in claim 11, wherein said clutch defines a pressure chamber communicating with said hydraulic drive line, the clutch being engaged or disengaged depending upon fluid pressure in said pressure chamber, and said hydraulic fluid supply system further includes a valve positionable to selectively establish fluid communication between said second pump and said hydraulic drive line and between said second pump and said hydraulic steering line, said valve being responsive to a difference between the discharge pressure of said first pumping and pressure in said hydraulic steering line by placing said second pump in fluid communication with both said pressure chamber of said clutch, which causes the clutch to engage, and said hydraulic steering line when said difference is smaller than a given value and by placing said second pump in fluid communication with said pressure chamber but not said hydraulic steering line when said pressure difference is greater than said given value.

13. A hydraulic drive system as set forth in claim 8, and which further comprises a clutch disposed between said drive axle and said steerable wheel, said clutch being engageable and disengageable to allow and prevent a driving torque from said drive axle to be transmitted to said steering wheel.

14. A hydraulic drive system as set forth in claim 13, wherein said clutch defines a pressure chamber communicating with said hydraulic drive line, the clutch being engaged or disengaged depending upon fluid pressure in said pressure chamber, and said hydraulic fluid supply system further includes a valve positionable to selectively establish fluid communication between said second pump and said hydraulic drive line and between said second pump and said hydraulic steering line, said valve being responsive to a difference between the discharge pressure of said first pumping and pressure in said hydraulic steering line by placing said second pump in fluid communication with both said pressure chamber of said clutch, which causes the clutch to engage, and said hydraulic steering line when said difference is smaller than a given value and by placing said second pump in fluid communication with said pressure chamber but not said hydraulic steering line when said pressure difference is greater than said given value.

15. A hydraulic drive system for a steerable wheel for a vehicle also having a primary drive wheel driven by a vehicular prime mover, said system comprising:

a steering assembly interposed between the steerable wheel and a body of the vehicle, the steering assembly mounting the steerable wheel on the body of the vehicle so as to be steerable, said steering assembly including a pivotal member pivotable about a substantially vertical axis, said pivotal member having an external end on which the steerable wheel is mounted;

a hydraulic drive assembly including a hydraulic motor;

a drive axle drivingly coupling the hydraulic motor to the steerable wheel so as to rotate the steerable wheel when said motor is driven;

a hydraulic steering system connected to said pivotal member;

a first pump driven at a speed corresponding to an output of the engine of the vehicle, and a hydraulic steering line placing said first pump in constant fluid communication with said hydraulic steering system such that a pressurized fluid is supplied to said hydraulic steering system to effect steering;

a second pump driven at a speed corresponding to a rotational speed of the primary drive wheel of the vehicle, and connected to said hydraulic motor so as to drive said hydraulic motor at a speed proportional to the rotational speed of said drive wheel.

16. A hydraulic drive system as set forth in claim 15, wherein said hydraulic fluid supply system further comprises a valve which is positionable to establish fluid communication between said second pump and said hydraulic drive line and between said second pump and said hydraulic steering line such that said valve selectively hydraulically connects said second pump to said hydraulic motor and to said steering assembly.

17. A hydraulic drive system as set forth in claim 16, wherein said valve normally connects said second pump to said hydraulic drive line and is responsive to a given pressure difference between the discharge pressure of said first pump and pressure in said hydraulic steering line, indicative of a shortage of discharge pressure produced by said first pump, by establishing fluid communication between said second pump and said hydraulic steering line.

18. A hydraulic drive system as set forth in claim 17, and which further comprises a clutch disposed between said hydraulic motor and said drive axle, said clutch being engageable and disengageable to allow and prevent transmission of driving torque, produced by said hydraulic motor, to said drive axle.

19. A hydraulic drive system as set forth in claim 18, wherein said clutch defines a pressure chamber communicating with said hydraulic drive line, the clutch being engaged or disengaged depending upon fluid pressure in said pressure chamber, and said hydraulic fluid supply system further includes a valve positionable to selectively establish fluid communication between said second pump and said hydraulic drive line and between said second pump and said hydraulic steering line, said valve being responsive to a difference between the discharge pressure of said first pumping and pressure in said hydraulic steering lineby placing said second pump in fluid communication with both said pressure chamber of said clutch, which causes the clutch to engage, and said hydraulic steering line when said difference is smaller than a given value and by placing said second pump in fluid communication with said pressure chamber but not said hydraulic steering line when said pressure difference is greater than said given value.

20. A hydraulic drive system as set forth in claim 17, and which further comprises a clutch disposed between said drive axle and said steerable wheel, said clutch being engageable and disengageable to allow and prevent a driving torque from said drive axle to be transmitted to said steerable wheel.

21. A hydraulic drive system as set forth in claim 20, wherein said clutch defines a pressure chamber communicating with said hydraulic drive line, the clutch being engaged or disengaged depending upon fluid pressure in said pressure chamber, and said hydraulic fluid supply system further includes a valve positionable to selectively establish fluid communication between said second pump and said hydraulic drive line and between said second pump and said hydraulic steering line, said valve being responsive to a difference between the discharge pressure of said first pumping and pressure in said hydraulic steering line by placing said second pump in fluid communication with both said pressure chamber of said clutch, which causes the clutch to engage, and said hydraulic steering line when said difference is smaller than a given value and by placing said second pump in fluid communication with said pressure chamber but not said hydraulic steering line when said pressure difference is greater than said given value.

\* \* \* \* \*